(12) United States Patent
Garani et al.

(10) Patent No.: US 9,837,119 B2
(45) Date of Patent: *Dec. 5, 2017

(54) IDENTIFYING A DEFECT IN A DATA-STORAGE MEDIUM

(71) Applicant: STMICROELECTRONICS, INC., Coppell, TX (US)

(72) Inventors: Shayan Srinivasa Garani, San Diego, CA (US); Sivagnanam Parthasarathy, Carlsbad, CA (US)

(73) Assignee: STMICROELECTRONICS, INC, Carrollton, TX (US)

(*) Notice: Subject to any disclaimer, the term of this patent is extended or adjusted under 35 U.S.C. 154(b) by 98 days.

This patent is subject to a terminal disclaimer.

(21) Appl. No.: 14/949,328

(22) Filed: Nov. 23, 2015

(65) Prior Publication Data

US 2016/0077941 A1 Mar. 17, 2016

Related U.S. Application Data

(62) Division of application No. 12/860,653, filed on Aug. 20, 2010, now Pat. No. 9,324,370.

(51) Int. Cl.
*G11B 27/36* (2006.01)
*G11B 20/18* (2006.01)
(Continued)

(52) U.S. Cl.
CPC ...... *G11B 20/1833* (2013.01); *G06F 11/2094* (2013.01); *G06F 2201/805* (2013.01); *G06F 2201/85* (2013.01); *G11B 20/10037* (2013.01); *G11B 20/10046* (2013.01); *G11B 20/10064* (2013.01); *G11B 20/10074* (2013.01); *G11B 20/10222* (2013.01); *G11B 20/10287* (2013.01); *G11B 20/10296* (2013.01); *G11B 20/10379* (2013.01); *G11B 2020/185* (2013.01);
(Continued)

(58) Field of Classification Search
CPC ...... G11B 20/10296; G11B 2020/1823; G11B 2020/1826; G11B 20/1833; G11B 2020/185; G06F 2201/805; G06F 2201/85
See application file for complete search history.

(56) References Cited

U.S. PATENT DOCUMENTS 7,130,257 B2 10/2006 Taguchi et al.
7,839,588 B1 11/2010 Dang et al.
(Continued)

OTHER PUBLICATIONS

Srinivasa et al., "Defect detection and correction in media recording channels using parity check codes", Nov. 2009, pp. 1-4 See Priority U.S. Appl. No. 12/860,653, filed Aug. 20, 2010.
(Continued)

*Primary Examiner* — Regina N Holder
(74) *Attorney, Agent, or Firm* — Slater Matsil, LLP

(57) ABSTRACT

An embodiment of a data-read path includes a defect detector and a data-recovery circuit. The defect detector is operable to identify a defective region of a data-storage medium, and the data-recovery circuit is operable to recover data from the data-storage medium in response to the defect detector. For example, such an embodiment may allow identifying a defective region of a data-storage disk caused, e.g., by a scratch or contamination, and may allow recovering data that was written to the defective region.

17 Claims, 8 Drawing Sheets

(51) Int. Cl.
*G06F 11/20* (2006.01)
*G11B 20/10* (2006.01)

(52) U.S. Cl.
CPC .............. *G11B 2020/1823* (2013.01); *G11B 2020/1826* (2013.01); *G11B 2020/1863* (2013.01); *G11B 2220/2516* (2013.01)

(56) References Cited

U.S. PATENT DOCUMENTS

| | | |
|---|---|---|
| 7,849,385 B2 | 12/2010 | Tan et al. |
| 9,324,370 B2 * | 4/2016 | Garani ............... G11B 20/1833 |
| 2008/0262643 A1 | 10/2008 | Creigh et al. |
| 2008/0297935 A1 | 12/2008 | Kawamae et al. |
| 2009/0235116 A1 | 9/2009 | Tan et al. |
| 2010/0074078 A1 | 3/2010 | Cao et al. |

OTHER PUBLICATIONS

Tan et al., "Detection of media defects in perpendicular magnetic recording channels", IEEE Transactions on Magnetics, vol. 41, No. 10, Oct. 2005, pp. 2956-2958 See Priority U.S. Appl. No. 12/860,653, filed Aug. 20, 2010.

Tan et al., "Erasure detection algorithms for magnetic recording channels", IEEE Transactions on Magnetics, vol. 40, No. 4, Jul. 2004, pp. 3099-3101 See Priority U.S. Appl. No. 12/860,653, filed Aug. 20, 2010.

* cited by examiner

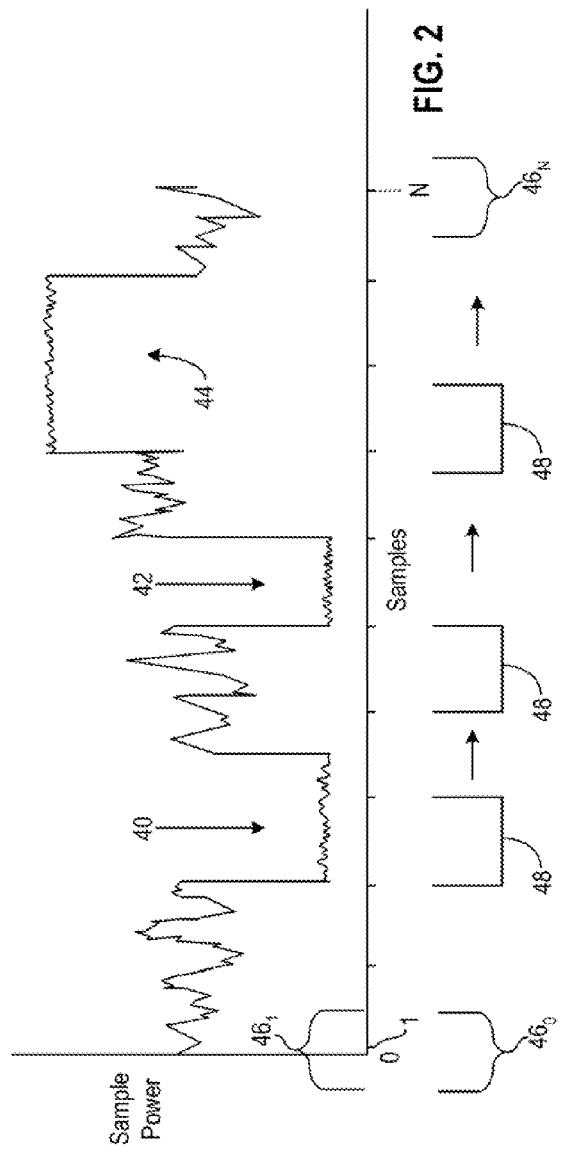
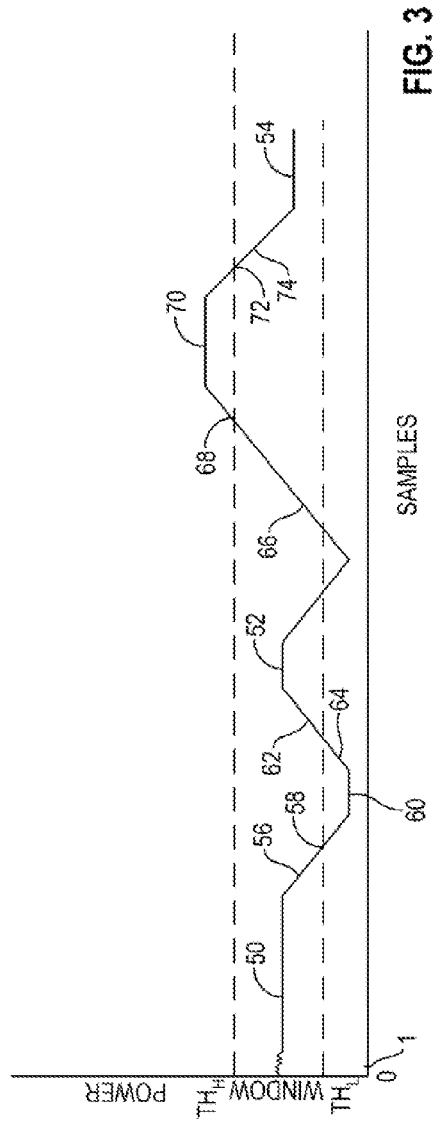

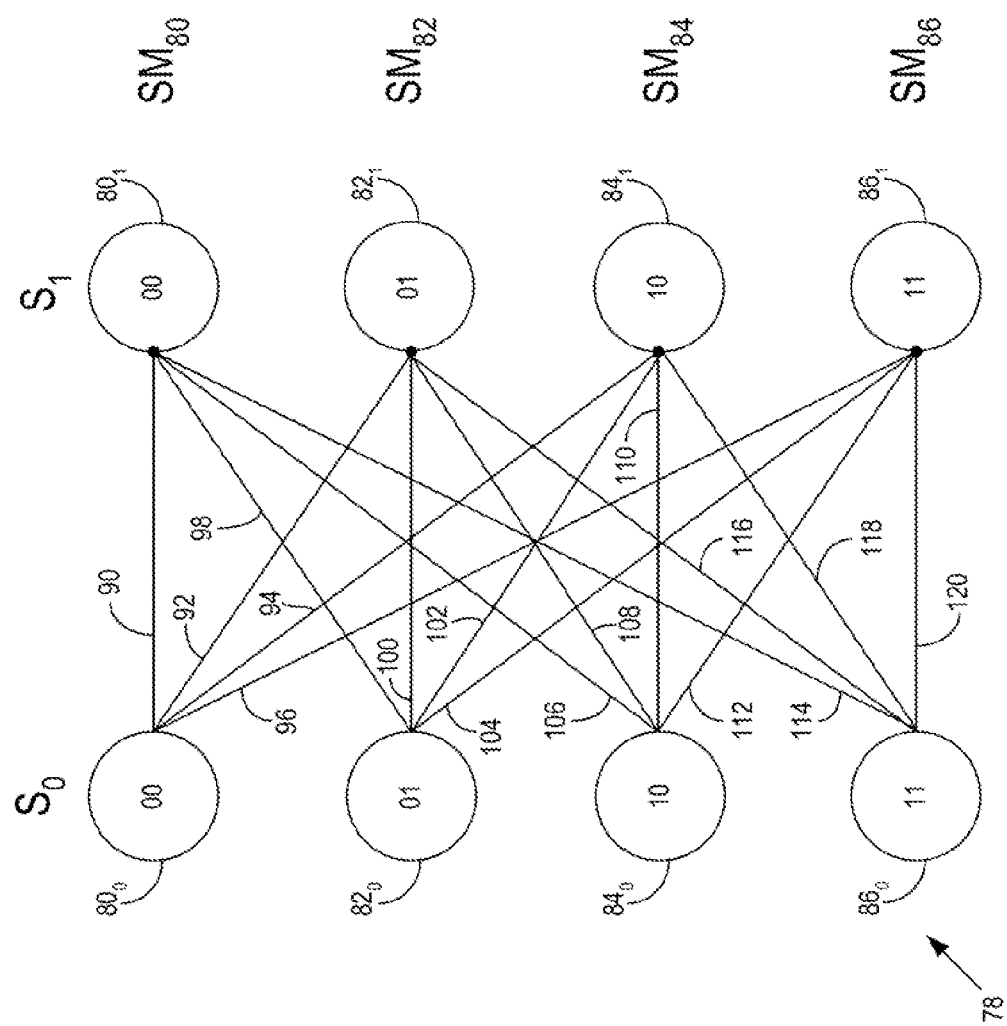

IDENTIFYING A DEFECT IN A DATA-STORAGE MEDIUM

SUMMARY

An embodiment of a data-read path includes a defect detector and a data-recovery circuit. The defect detector is operable to identify a defective region of a data-storage medium, and the data-recovery circuit is operable to recover data from the data-storage medium in response to the defect detector.

For example, such an embodiment may allow identifying a defective region of a data-storage disk caused, e.g., by a scratch or contamination, and may allow recovering data that was written to the defective region.

BRIEF DESCRIPTION OF THE DRAWINGS

FIG. 2 is plot of the powers of read-signal samples taken from a sector of a data-storage medium that includes a defective region.

FIG. 3 is a plot of the powers of overlapping windows of the read-signal samples of FIG. 2.

FIG. 4 is a trellis diagram for an embodiment of a Viterbi detector, and shows the state metrics for the detector states at a particular sample time.

DETAILED DESCRIPTION

Manufacturers of data-storage devices (e.g., disk drives) are continually searching for techniques that allow increasing the amount of data that these devices may store on their data-storage media.

One such technique is using a high-code-rate error-correcting code (HCRECC), such as a low-density parity code (LDPC), to reduce the number of redundant elements (e.g., redundant bits such as parity bits) stored on a data-storage medium. For a given storage capacity, the fewer the number of redundant elements, the greater the amount of data that may be stored on the medium.

Unfortunately, defects in the storage medium may degrade the performance of a HCRECC to such a low level that the HCRECC cannot provide a sufficient error-correction capability.

Figure 1:
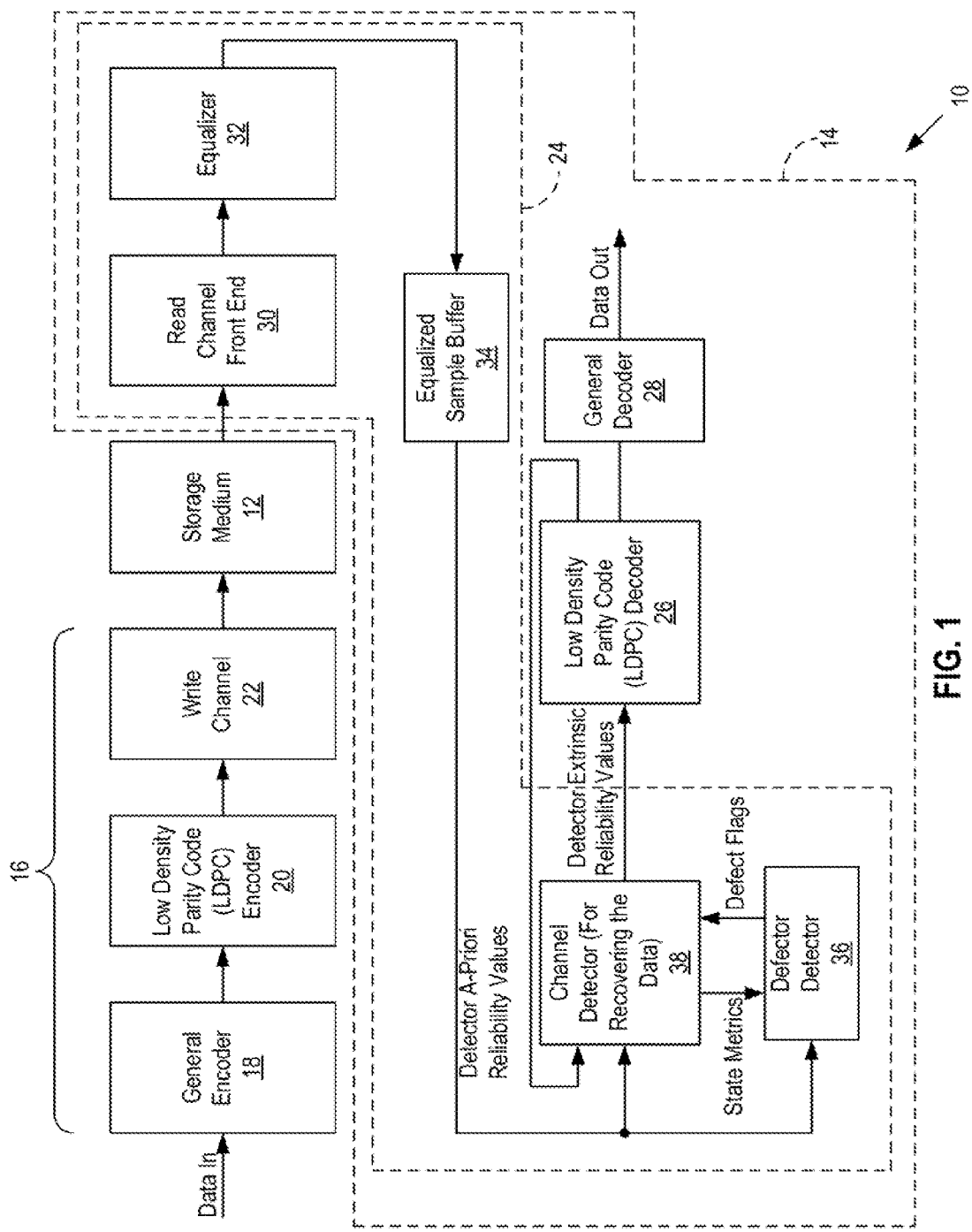
FIG. 1 is a block diagram of an embodiment of a data path that includes a read path operable to identify a defective region of a storage medium and to recover data written to the defective region.

FIG. 1 is a block diagram of an embodiment of a data path 10, which includes a data-storage medium 12 and a read path 14 for reading data from the storage medium. As discussed below, the read path 14 may allow the use of a LDECC even in the presence of one or more defects in the storage medium 12.

In addition to the data-storage medium 12 and the read path 14, the data path 10 includes a write path 16 for writing data to the storage medium.

The write path 16 includes a general encoder 18, a HCRECC encoder, which is an LDPC encoder 20 in the described embodiment, and a write channel 22; the read path 14 includes a read channel 24, an HCRECC decoder, which is an LDPC decoder 26 in the described embodiment, and a general decoder 28.

The general encoder 18 receives an input data sequence, and encodes the data, for example, to compress the data and thus to increase the storage capacity of the data-storage medium 12.

The LDPC encoder 20 encodes the data from the general encoder 18 such that errors (e.g., noise, inter-symbol interference, errors caused by medium defects) introduced into the data by the storage medium 12 or the read channel 24 may be detected, located, and corrected.

And the write channel 22 includes, for example, a digital-to-analog converter (DAC), a low-noise pre-amplifier, and a read-write head (none of which is shown in FIG. 1) for respectively converting the coded data from the LDPC encoder 20 into an analog signal, driving the read-write head with the analog signal, and writing the coded data to the storage medium 12, e.g., by appropriately magnetizing areas of the storage medium.

Still referring to FIG. 1, the read channel 24 includes a read-channel front end 30, an equalizer 32, a buffer 34, a defect detector 36, and a channel detector (e.g., a soft-output Viterbi detector) 38.

The read-channel front end 30 includes, for example, the read-write head, a low-noise amplifier, an analog-to-digital converter (ADC), a timing-recovery loop, and a head-alignment loop (none of which is shown in FIG. 1); alternatively, the timing-recovery loop may be disposed on the output side of the equalizer 32. If, for example, the storage medium 12 is magnetic, then the read-write head converts the magnetic fields generated by the magnetized areas of the storage medium into an analog signal, and the amplifier provides this signal to the ADC for converting into a digital (e.g., binary) signal. And the timing-recovery loop effectively synchronizes a sample clock (not shown in FIG. 1) to data-element (e.g., data bit) storage regions (not shown in FIG. 1) of the storage medium 12, where the sample clock clocks the ADC. The head-alignment loop aligns the read-write head with the section (e.g., a data sector of a disk track) of data being read from the medium 12.

The equalizer 32 shapes the digital read signal from the read-channel front end 30 according to a target polynomial (e.g., PR4, EPR4, $E^2PR4$) of the read path 14, and the buffer 34 stores the equalized read-signal samples from the equalizer.

The defect detector 36 identifies defects in the storage medium 12, and provides to the channel detector 38 the respective regions of the storage medium in which these defects are present. As discussed below, the defect detector 36 may identify defects that give rise to burst errors, such as drop-in and drop-out errors, in the read signal. A burst error is a sequence of multiple, consecutive, erroneous data elements (e.g., data bits).

The channel detector 38 generates a sequence of recovered data elements (e.g., data bits) from the equalized samples stored in the buffer 34, and, for each recovered data element, generates a respective channel-detector reliability value such as an extrinsic log-likelihood ratio (LLR) as discussed below. The channel detector 38 also receives from the defect detector 36 the locations of the identified medium defects. In response to this information from the defect detector 36, the channel detector 38 may generate a modified reliability value for at least one of the data elements recovered from a defective medium location.

The LPDC decoder 26 iteratively decodes the recovered data elements (e.g., data bits) from the channel detector 38 according to a decoding algorithm that corresponds to the encoding algorithm implemented by the LPDC encoder 20, and that uses the reliability values from the channel detector. If the LPDC decoder 26 detects no errors in the recovered data bits, or if the decoder detects one or more errors but is able to correct all of these errors, then the decoder passes on the decoded data elements to the general decoder 28. Alternatively, as discussed below, if the LPDC decoder 26 detects an uncorrectable error in the decoded data elements, then it generates a respective decoder reliability value such as an a-priori LLR, for each of the data elements, and feeds these decoder reliability values back to the channel detector 38, which re-processes the equalized samples taking into account these decoder reliability values. The channel detector 38 and the LPDC decoder 26 may repeat this procedure until the LPDC decoder finds no errors (or corrects all found errors) in the decoded data sequence, or for a maximum number of iterations. If the LPDC decoder 26 finds uncorrectable errors after the maximum number of iterations have been performed, then the channel detector 38 or the LPDC decoder may request that the read-channel front end 30 re-read the sector of the storage medium 12 that includes the defective region.

The general decoder 28 decodes the data from the LPDC decoder 26 according to a decoding algorithm that corresponds to the encoding algorithm implemented by the general encoder 18. For example, the general decoder 28 may decompress the data from the LPDC decoder 26.

An example of the operation of an embodiment of the defect detector 36 is discussed below in conjunction with FIGS. 1-3. In this example, the samples of the read signal generated by the read-channel front end 20 are binary samples such that the data elements recovered by the channel detector 38 and decoded by the LDPC decoder 26 and the general decoder 28 are binary elements, i.e., data bits. Furthermore, in this example the estimated minimum defect length corresponds to a data sequence of fifty one consecutive bits.

As discussed above, a storage-medium defect may give rise to a data burst error, which, when the data is binary, is a sequence of consecutive data bits that are rendered unreliable due to the defect.

Two common types of such defect-induced burst errors are a drop-in burst error and a drop-out burst error. The data samples taken from a defective region and that form a drop-in burst error each have a magnitude, and thus a power, that are, on average, significantly higher than the magnitudes and powers of data samples taken from non-defective regions of the storage medium 12. In contrast, the data samples taken from a defective region and that form a drop-out burst error each have a magnitude, and thus a power, that are, on average, significantly lower than the magnitudes and powers of data samples taken from non-defective regions of the storage medium 12.

FIG. 2 is plot of the powers of example equalized read-signal samples taken from a sector of the data-storage medium 12, the sector including three defective regions that respectively give rise to drop-out errors 40 and 42 and drop-in error 44.

Referring to FIGS. 1 and 2, the sample powers are generated by squaring the equalized samples from the sample buffer 34, where the samples from the buffer digitally represent the equalized amplitudes of the read signal at corresponding sample times. And because, as discussed above, the timing-recovery loop synchronizes the sample times to the data-bit storage locations of the data sector, each sample corresponds to a respective location of the storage medium 12. Therefore, as discussed further below, by using the sample powers to detect and identify drop-in and drop-out errors, an embodiment of the defect detector 36 may detect and identify defective regions of the storage medium 12.

In the following example, the data bits are stored on the storage medium 12 in data sectors that are each five hundred seventy six bytes long (five hundred and twelve bytes of data and sixty four bytes of parity bits, one parity bit for each data byte), for a total length of four thousand six hundred eight bits per sector.

For ease of explanation, however, the x-axis of FIG. 2 only includes the first N bits of a data sector, wherein N is approximately five hundred in this example. It is understood that the powers of the remaining samples from the data sector may be plotted to the right of the $N^{th}$ sample in a similar manner.

Referring to FIG. 2, the powers of the samples that form the drop-out errors 40 and 42 are significantly lower than the powers of the samples taken from non-defective regions of the data sector, and the powers of the samples that compose the drop-in error 44 are significantly higher than the powers of the samples taken from non-defective regions.

Also shown in FIG. 2 are overlapping regions $46_0$-$46_N$ (only some of these regions shown for clarity), which are generated by a "sliding" window 48, and over which the powers of a number of samples, for example, fifty one samples, are averaged and assigned to a respective sample for each window region. For example, the number of samples in the window 48 may be the estimated expected minimum defect length on the medium 12, and the average power value for a window region 46 may be assigned to the sample at the center of the window. Averaging the sample power levels may allow the defect detector 36 to identify burst errors, and thus defective regions of the storage medium 12, by accounting for outliers (e.g., a power level of a sample within a drop-out error being as high as the power level of a sample from a non-defective region).

FIG. 3 is a plot of the average powers of the overlapping window regions 46 of the window 48 of FIG. 2 for the first N samples of FIG. 2. Also shown in FIG. 3 are two thresholds $TH_L$ and $TH_H$, which, as discussed below, the defect detector 36 (FIG. 1) may use to respectively detect and identify drop-out and drop-in errors, and thus, may use to detect corresponding defective regions of the storage medium 12 (FIG. 1).

Referring to FIGS. 1-3, an example of the operation of an embodiment of the defect detector 36 is described.

The defect detector 36 starts the window 48 at a first window location $46_0$, in which the center of the window is at the origin of the x-axis of FIG. 2, and computes the average power of all the samples within the window. For example, if the window 48 has a width of fifty one samples, then the first window location $46_0$ includes the first twenty five samples of the data sector (the other twenty six samples within the window location $46_0$ are assumed to be zero unless the origin of the plot of FIG. 2 does not represent the beginning of the data sector). The defect detector 36 then assigns the average power level for the first window location $46_0$ to the origin of the x-axis of FIG. 3.

Next, the defect detector 36 shifts the window 48 rightward by one sample along the x-axis of FIG. 2 to a second window location $46_1$ having a center at the sample 1 of FIG. 2. The defect detector 36 then computes the average power of all the samples within the window 48 at the second window location $46_1$, and assigns the average power level for the second window location to the sample 1 along the x-axis of FIG. 3.

The defect detector 36 continues shifting the window 48 rightward by one sample, and computing the window power for each window location 46, until the center of the window is aligned with the last sample of the data sector.

Referring to FIG. 3, as the defect detector 36 shifts the window 48 "over" samples from non-defective regions of the storage medium 12 (FIG. 1), such as the samples in plot sections 50, 52, and 54 of FIG. 3, the average window powers are approximately constant and are between the thresholds $TH_L$ and $TH_H$.

As the defect detector 36 shifts the window "over" the samples from the defective region of the storage medium 12 that causes the drop-out error 40, the window powers begins to decrease in a plot section 56. At approximately a point 58 of the plot, the window powers begin to fall below $TH_L$. When the window 48 is fully over the samples from the defective medium region that causes the drop-out error 40, the window powers are approximately at a minimum value in a plot section 60, and remain substantially at this minimum value until the defect detector 36 begins shifting the window away from the drop-out error 40, at which point the window powers begin to increase in a plot region 62. At approximately a plot point 64, the window powers begin to rise above $TH_L$.

A similar analysis applies as the defect detector 36 shifts the window 48 over the samples from the defective region of the storage medium 12 that causes the drop-out error 42.

As the defect detector 36 shifts the window over the samples from the defective region of the storage medium 12 that causes the drop-in error 44, the window powers begin to increase in a plot section 66. At approximately a point 68 of the plot, the window powers begin to increase above $TH_H$. When the window 48 is fully over the samples from the defective medium region that causes the drop-in error 44, the window powers are approximately at a maximum value in a plot section 70, and remain substantially at this maximum value until the data detector 36 begins shifting the window away from the drop-in error 44, at which point the window powers begin to decrease in a plot region 72. At approximately a plot point 74, the window powers begin to fall below $TH_H$.

Referring to FIGS. 1 and 3, the defect detector 36 may then detect and identify the drop-out error 40 as beginning at approximately the sample corresponding to the plot point 58 and ending at approximately the sample corresponding to the plot point 64. That is, the defect detector 36 may identify the drop-out error 40 as including all samples within the plot regions 56, 60, and 62 that have window powers less than $TH_L$, or that have window powers less than or equal to $TH_L$. Alternatively, to account for possible tolerances and errors in the generation of the window-power plot of FIG. 3, the defect detector 36 may effectively increase the size of the identified drop-out error 40 by subtracting a first number (e.g., ten) from the sample number corresponding to the approximately plot point 58, and by adding a second number (e.g., twelve) to the sample number corresponding to the approximately plot point 64, where the first and second numbers may be the same or may be different. Therefore, the beginnings of the drop-out error 40, as identified by the defect detector 36, would be at a sample that is approximately the first number of samples to the left of approximately the point 58; likewise, the ending of the drop-out error 40 would be at a sample that is the second number of samples to the right of approximately the point 64.

The defect detector 36 may detect and identify the beginning and ending samples for the drop-out error 42 in a similar manner.

The defect detector 36 may next detect and identify the drop-in error 44 as beginning at approximately the sample corresponding to the plot point 68 and ending at approximately the sample corresponding to the plot point 74. That is, the defect detector 36 may identify the drop-in error 44 as including all samples within the plot regions 66, 70, and 72 that have window powers greater than $TH_H$, or that have window powers greater than or equal to $TH_H$. Alternatively, to account for possible tolerances and errors in the generation of the window-power plot of FIG. 3, the defect detector 36 may effectively increase the size of the identified drop-in error 44 by subtracting a first number (e.g., ten) from the sample number corresponding to approximately the plot point 68, and by adding a second number (e.g., twelve) to the sample number corresponding to approximately the plot point 74, where the first and second numbers may be the same or different. Therefore, the beginning of the drop-in error 44, as identified by the defect detector 36, would be at the sample that is the first number of samples to the left of approximately the point 68; likewise, the ending of the drop-in error 44 would be at a sample that is the second number of samples to the right of approximately the point 74.

Then, the defect detector 36 provides the starting and ending samples for the burst errors 40, 42, and 44 to the channel detector 38, which, as discussed below, uses this information to recover, from the equalized samples, the data bits written to the storage medium 12 by the write channel 22.

Referring again to FIGS. 1-3, the defect detector 36 may detect and identify burst errors, such as drop-in and drop-out burst errors, and thus may detect and identify the defective regions of the storage medium 12 that give rise to such burst errors, without additional coding overhead that may reduce the data-storage capacity of the storage medium.

Referring to FIGS. 1 and 3, the threshold levels $TH_L$ and $TH_H$ may be determined in a number of ways. For example, $TH_L$ and $TH_H$ may be constant values that are determined empirically from the, e.g., type of storage medium 12.

Alternatively, $TH_L$ and $TH_H$ may be initially determined empirically per above, and then may be updated periodically. For example, the defect detector 36 may store a maximum window-power value and a minimum window-power value, and update these values when ever a window-power value exceeds the stored maximum value or is less than the stored minimum value. After the read path 24 processes a number, e.g., ten thousand, data sectors, the defect detector 36 may compare the difference between the max and min window-power values to the difference between these values at the last calibration time (the defect detector may be programmed with an initial difference to be used for the first calibration). If the absolute value of the difference between these two max-min window-power differences is above a calibration threshold, then the defect detector 36 may set $TH_L$ equal to a first factor (e.g., 0.1) times the current max window-power value, and may set $TH_H$ equal to a second factor (e.g., 0.9) times the current max window-power value. Alternatively, if the absolute value of the difference is below the calibration threshold, then the defect detector 36 may leave $TH_L$ and $TH_H$ unaltered. In this way, the defect detector 36 may track in, e.g., the storage medium 12, the read channel 14, and the write channel 16, changes that may alter the window-power values over time.

Regardless of whether the defect detector 36 periodically calibrates $TH_L$ and $TH_H$, it may also compare the window powers to fixed thresholds that may differ from $TH_L$ and $TH_H$ to guard against a situation where an entire data sector is defective, but yields window-power values that are between $TH_L$ and $TH_H$.

Alternative embodiments of the defect detector 36 are contemplated. For example, the defect detector 36 may compute a window value by a mathematical operation other than averaging of the sample power. Furthermore, the computed window value may be assigned to a sample (e.g., the first sample or the last sample) within a window location 46 other than the center sample. Moreover, the defect detector 36 may use the above-described technique to detect burst errors, and thus defective medium regions, having lengths that are less than that of the window 48 being used. In addition, the defect detector 36 may use a window 48 of any size, even as short as one data element.

FIG. 4 is an example of a trellis diagram 78 for an embodiment of the channel detector 38 of FIG. 1, where the channel detector includes a binary Viterbi detector, or otherwise performs a binary Viterbi algorithm or another partial-response binary algorithm. Although a binary, four-path, time-invarying, fully connected trellis diagram is shown, it is understood that the channel detector 38 may operate according to a trellis diagram that is other than binary, has more or fewer than four paths, is time-varying, or is partially connected (e.g., "pruned" according to a coding constraint).

The trellis diagram 78 has two state times $S_0$ and $S_1$, where the state time $S_0$ is during one cycle of the sample clock used to clock the ADC of the read-channel front end 30 of FIG. 1, and where the state time $S_1$ is during the next cycle of the sample clock. So one may think of the active sample-clock edge (e.g., the transition between sample-clock cycles) as occurring between $S_0$ and $S_1$.

At both times $S_0$ and $S_1$, the two most recent bits of the data sequence being recovered by the channel detector 38 have one of four possible states 80-86: 00, 01, 10, and 11. As is known, the channel detector 38 eventually causes the data-sequence paths through the trellis diagram 78 to converge to a single data-sequence path that represents the recovered data sequence.

The possible data-sequence paths through each state $80_0$-$86_0$ at the time $S_0$ may continue to any of the possible states $80_1$-$86_1$ at the time $S_1$ via respective trellis branches 90-120. For example, the data-sequence path through the state $80_0$ may continue to the state $80_1$ via the branch 90, may continue to the state $82_1$ via the branch 92, may continue to the state $84_1$ via the branch 94, and may continue to the state $86_1$ via the branch 96. A similar analysis applies to the possible data-sequence paths through the other states $82_0$-$86_0$.

At the time $S_1$, however, for each state $80_1$-$86_1$, the channel detector 38 determines a respective "surviving" data-sequence path, which includes the branch from the most probable previous state $80_0$-$86_0$ of the surviving data-sequence path. For example, for the data-sequence path through the state $80_1$, the channel detector 38 selects, in a conventional manner, the data-sequence path through the one of the states $80_0$-$86_0$ having the highest probability of being the correct data-sequence path to the state $80_1$. If, for example, the most probable data-sequence path to the state $80_1$ is the data-sequence path is through the state $86_0$, then the channel detector 38 effectively deletes the branches 90, 98, and 106, such that only the branch 114 remains, and, thus, such that the state $80_1$ now lies along only the data-sequence path that includes the state $86_0$.

Therefore, at time $S_1$, each state $80_1$-$86_1$ has a respective state metric $SM_{80}$-$SM_{86}$ equal to the most recent bit of the state $80_0$-$86_0$ lying along the surviving data-sequence path for that state $80_1$-$86_1$. For example, if the surviving data-sequence path to the state $80_1$ lies along the branch 114, then $SM_{80}=1$, because the most recent bit of the state $86_0$ equals logic 1. Likewise, if the surviving path to the state $80_1$ lies along the branch 106, then $SM_{80}=0$ because the most recent bit of the state $84_0$ equals 0.

Referring to FIGS. 2 and 4, it has been discovered that for state times S corresponding to samples taken from defective storage-medium regions that cause burst errors (e.g., such as drop-out errors 40 and 42 and drop-in error 44), the state metrics SM stay the substantially the same, with few, if any, changes. For example, during the state times corresponding to the samples that compose the drop-out error 40, the state-metric vector $SM_{80}$-$SM_{86}$ may stay substantially equal to either 1111, 0000, 1010, or 0101.

Figure 5:
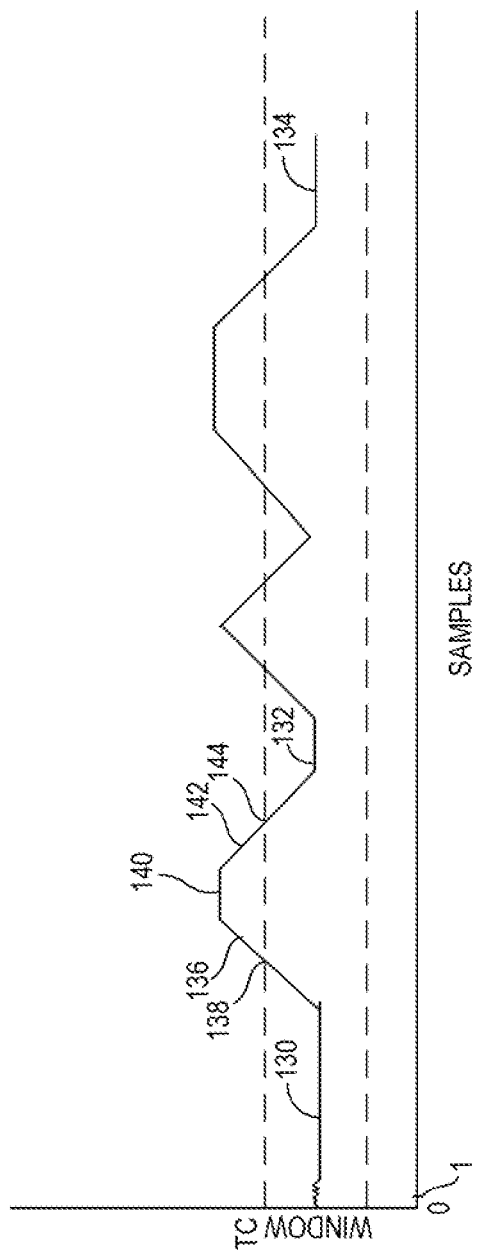
FIG. 5 is a plot of the correlations of overlapping windows of the state-metric vectors from an embodiment of the channel detector of FIG. 1.

FIG. 5 is a plot of the correlations of the state-metric vectors $SM_{80}$-$SM_{86}$ corresponding to the overlapping window regions 46 of the window 48 of FIG. 2 for the first N samples of FIG. 2. Also shown in FIG. 5 is a threshold TC, which, as discussed below, the defect detector 36 (FIG. 1) may use to detect and identify drop-out and drop-in errors, and, thus, to detect and identify corresponding defective regions of the storage medium 12 (FIG. 1).

Referring to FIGS. 1, 4, and 5, an example of the operation of another embodiment of the defect detector 36 of FIG. 1 is described.

The defect detector 36 starts the window 48 at a first window location $46_0$, in which the center of the window is at the origin of the x-axis of FIG. 2, and computes the correlation of the state-metric vectors $SM_{80}$-$SM_{86}$ that correspond to all the samples within the window. For example, if the window 48 has a width of fifty one samples, then the first window location $46_0$ includes the first twenty five samples of the data sector (the other twenty six samples within the window location $46_0$ are assumed to be zero unless the origin of the plot of FIG. 2 does not represent the beginning of the data sector). The defect detector 36 then assigns the computed correlation value for the first window location $46_0$ to the origin of the x-axis of FIG. 5.

Next, the defect detector 36 shifts the window 48 rightward by one sample along the x-axis of FIG. 2 to a second window location $46_1$ having a center at the sample 1 of FIG. 2. The defect detector 36 then computes the correlation of the state-metric vectors $SM_{80}$-$SM_{86}$ that correspond to all the samples within the window 48 at the second location $46_1$, and assigns the computed correlation value for the second window location to the sample 1 along the x-axis of FIG. 5.

The defect detector 36 continues shifting the window 48 rightward by one sample, and computing the correlation of the state-metric vectors $SM_{80}$-$SM_{86}$ for each window location 46, until the center of the window is aligned with the last sample of the data sector.

Referring to FIG. 5, as the defect detector 36 shifts the window 48 "over" samples from non-defective regions of the storage medium 12 (FIG. 1), such as the samples in plot sections 130, 132, and 134 of FIG. 5, the state-metric correlations are approximately constant and are below the threshold TC.

As the defect detector 36 shifts the window "over" the samples from the defective region of the storage medium 12 that causes the drop-out error 40, the correlation values begin to increase in a plot section 136. At approximately a point 138 of the plot, the correlation values begin to increase above TC. When the window 48 is fully over the samples from the defective medium region that causes the drop-out error 40, the state-metric correlation values are approximately at a maximum value in a plot section 140, and remain substantially at this maximum value until the defect detector 36 begins shifting the window away from the drop-out error 40, at which point the correlation values begin to decrease in a plot region 142. At approximately a plot point 144, the correlation values begin to fall below TC.

A similar analysis applies as the defect detector 36 shifts the window 48 over the samples from the defective regions of the storage medium 12 that cause the drop-out error 42 and the drop-in error 44.

Referring to FIGS. 1 and 5, the defect detector 36 may then detect and identify the drop-out error 40 as beginning at approximately the sample corresponding to the plot point 138 and ending at approximately the sample corresponding to the plot point 144. That is, the defect detector 36 may identify the drop-out error 40 as including all samples within the plot regions 136, 140, and 142 that have window correlation values greater than TC, or that have window correlation values greater or equal to TC. Alternatively, to account for possible tolerances and errors in the generation of the correlation plot of FIG. 5, the defect detector 36 may effectively increase the size of the identified drop-out error 40 by subtracting a first number (e.g., ten) from the sample number corresponding to approximately the plot point 138, and by adding a second number (e.g., twelve) to the sample number corresponding to approximately the plot point 144, where the first and second numbers may be the same or may be different. Therefore, the beginning of the drop-out error 40, as identified by the defect detector 36, would be at a sample that is the first number of samples to the left of approximately the point 58; likewise, the ending of the drop-out error 40 would be at a sample that is the second number of samples to the right of approximately the point 64.

The defect detector 36 may detect and identify the beginning and ending samples for the drop-out error 42 and the drop-in error 44 in a similar manner.

Then, the defect detector 36 provides the starting and ending samples for the burst errors 40, 42, and 44 to the channel detector 38, which, as discussed below, uses this information to recover, from the equalized samples, the data bits written to the storage medium 12 by the write channel 22.

Referring again to FIGS. 1 and 4-5, the defect detector 36 may detect and identify burst errors, such as drop-in and drop-out burst errors, and thus may detect and identify the defective regions of the storage medium 12 that give rise to such burst errors, without additional coding overhead that may reduce the data-storage capacity of the storage medium.

Referring to FIGS. 1 and 5, the threshold level TC may be determined in a number of ways. For example, TC may be a constant value that is determined empirically from the type of storage medium 12.

Alternatively, TC may be initially determined empirically per above, and then may be updated periodically. For example, the defect detector 36 may store a maximum window correlation value and a minimum window correlation value, and update these values when ever a window correlation value exceeds the stored maximum value or is less than the stored minimum value. After the read path 24 processes a number, e.g., ten thousand, data sectors, the defect detector 36 may compare the difference between the max and min window values to the difference between these values at the last calibration time (the defect detector may be programmed with an initial difference threshold to be used for the first calibration). If the absolute value of the difference between these two max-min correlation differences is above a calibration threshold, then the defect detector 36 may set TC equal to a factor (e.g., 0.9) times the current max correlation value. Alternatively, if the absolute value of the difference is below the calibration threshold, then the defect detector 36 may leave TC unaltered. In this way, the defect detector 36 may track in, e.g., the storage medium 12, the read channel 14, and the write channel 16, changes that may alter the window-correlation values over time.

Regardless of whether the defect detector 36 periodically calibrates TC, it may also compare the window correlation values to a fixed threshold that may differ from TC to guard against a situation where an entire data sector is defective, but yields window correlation values that are less than TC.

Alternative embodiments of the defect detector 36 are contemplated. For example, the defect detector 36 may compute a window value by a mathematical operation other than correlating the state-metric vector from the channel detector 38. Furthermore, the computed window value may be assigned to a sample (e.g., the first sample or the last sample) within a window location 46 other than the center sample. Moreover, the defect detector 36 may use the above-described technique to detect burst errors, and thus defective medium regions, having lengths that are less than that of the window 48 being used. In addition, the defect detector 36 may use a window 48 of any size, even as short as one data element.

Referring again to FIGS. 1-5, in summary, described above are example procedures by which embodiments of the defect detector 36 may detect and identify burst errors caused by, e.g., defective regions of the storage medium 12, and provide the locations of the identified burst errors to the channel detector 38.

Referring again to FIG. 1, an example operation of an embodiment of the channel detector 38 and LDPC decoder 26 is described. As discussed below, the channel detector 38 may use the burst-error identifications from the detect detector 36 while recovering a sequence of data elements stored in a data sector of the storage media 12. For purposes of explanation, it is assumed that the data elements are data bits, although other types of data elements (e.g., trinary and quaternary data elements) are contemplated. Furthermore, it is assumed that the channel detector 38 includes a soft-output Viterbi detector, or otherwise executes a soft-output Viterbi algorithm, although it is contemplated that the channel detector may execute other types of data-recovery algorithms.

During a first "over" iteration, the channel detector 38 processes the equalized samples from the sample buffer 34, generates a sequence of data bits, and for each data bit, generates a respective full log-likelihood ratio (LLR), which is the log of the probability that the data bit is a logic 1 divided by the log of the probability that the data bit is a logic 0. So each LLR has a range, at least theoretically, from zero to infinite.

Next, for each data bit that is not identified by the defect detector 36 as being part of a burst error (e.g., the drop-out error 40 of FIG. 2), the channel detector 38 generates an extrinsic LLR by subtracting from the full LLR an a-priori LLR from the LDPC decoder 26. During this first iteration, the a-priori LLR is zero. But during subsequent iterations (if there are any subsequent iterations), the a-priori LLR may not be zero.

But for each data bit that is identified by the defect detector 36 as being part of a burst error, the channel detector 38 multiplies the a-priori LLR from the LDPC decoder 26 by a scale factor $\alpha$, and then generates a modified extrinsic LLR by subtracting from the full LLR this modified a-priori LLR; in an embodiment $\alpha<1$. Again, during this first outer iteration, the a-priori LLR from the LDPC decoder 26 is zero so that the extrinsic LLR is actually not modified. But during subsequent outer iterations (if there are any subsequent iterations), the a-priori LLR may not be zero, in which case the extrinsic LLR is actually modified. Modifying the a-priori LLR in this manner effectively "tells" the LDPC decoder 26 that the value of the corresponding data bit is less certain because of the burst error, and, in response, the LDPC decoder may tune its decoding operation accordingly to decode the recovered data more quickly, more accurately, or both more quickly and more accurately.

The scale factor $\alpha$ may have any suitable value. For example, $\alpha=0.5$ has been found to work well in some applications. Furthermore, $\alpha$ may be constant, may vary spatially with the relative sample location within the burst error, or may vary over time.

Still referring to FIG. 1, the LDPC decoder 26 then conventionally decodes the recovered data bits from the channel detector 38 using the extrinsic LLRs from the channel detector. Specifically, the LDPC decoder 26, in one or more "internal" iterations, generates one or more sequences of data bits (these sequences may be different from the recovered sequence received from the channel detector 38), and generates respective sets of syndromes from these sequences.

If the LDPC decoder syndromes equal zero after these internal iterations, then the LDPC decoder 26 provides the corresponding sequence of decoded data bits to the general decoder 28, and the channel detector 38 begins to process the equalized samples from the next data sector.

But if the LDPC decoder syndromes do not all equal zero after these internal iterations, then the LDPC decoder 26 generates, for each data bit, a full LLR and an a-priori LLR equal to the full LLR minus the extrinsic LLR previously provided by the channel detector 38 per above.

Next, the channel detector 38 and the LDPC decoder 26 perform one or more subsequent outer iterations of the above procedure until either the LDPC decoder 26 generates a data sequence for which all of the LDPC syndromes equal zero, or until the number of outer iterations equals or exceeds a maximum desired number. In the former case, for example, the LDPC syndromes may equal zero after no more than three outer iterations. In the latter case, the LDPC decoder 26 or the channel detector 38 may instruct the read-channel front end 30 to re-read the data sector so that the LDPC decoder 26 and the channel detector 38 may begin a new set of outer iterations of the above procedure using the new samples generated by the front end.

Referring again to FIG. 1, although the defect detector 36 has been described as detecting a burst error so as to identify a defective region of a storage medium 12, an embodiment of the defect detector may use one of the procedures described above, or another procedure, to detect burst errors in read signals that originate from other than a storage medium, for example, a wireless data signal.

Figure 6:
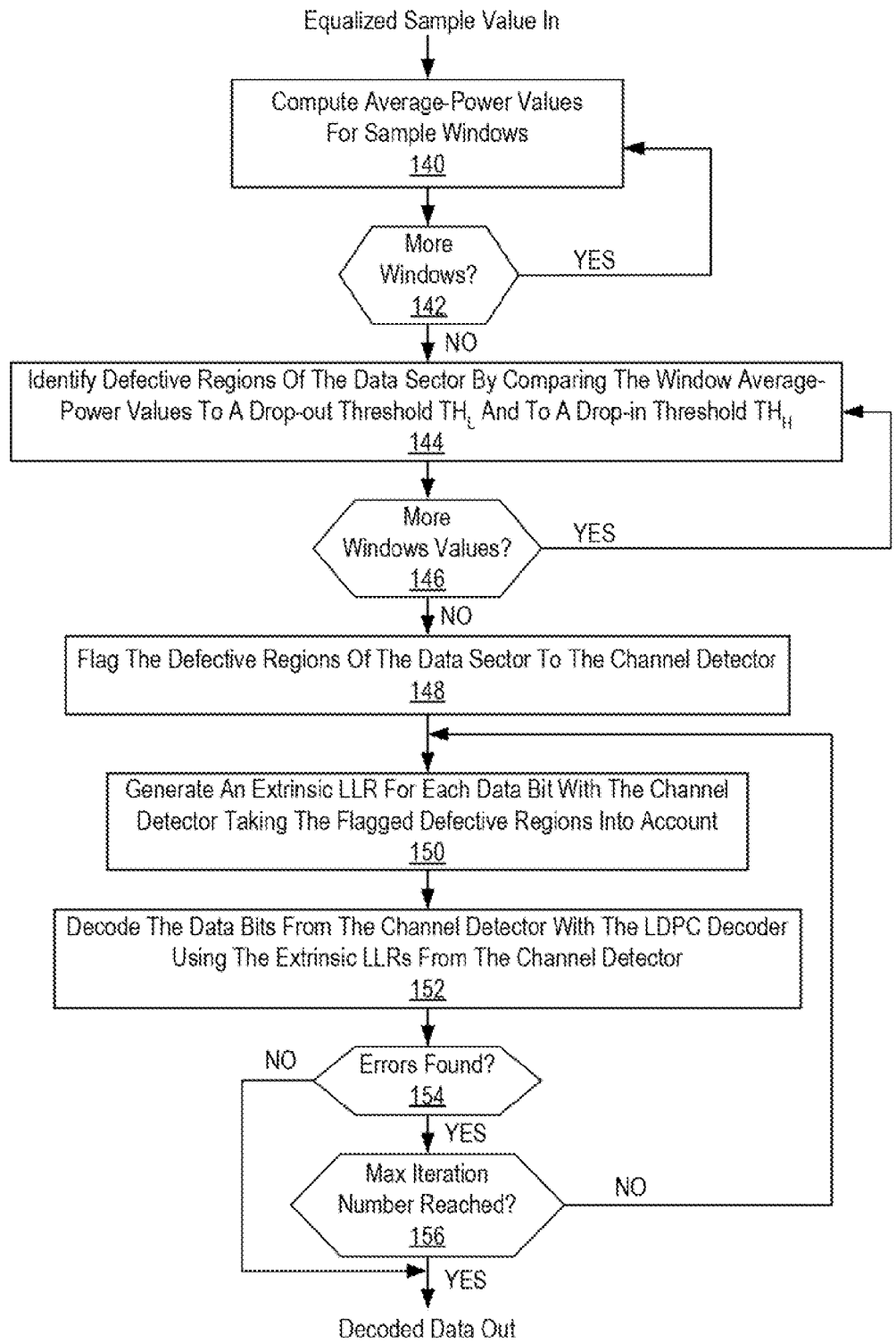
FIG. 6 is a flow diagram of an embodiment of a technique that may be implemented by an embodiment of the read path of FIG. 1 for identifying detective regions of a storage medium and for recovering data written to the identified detective regions.

FIG. 6 is a flow diagram of an example of the operation of an embodiment of the defect detector 36, channel detector 38, and LDPC decoder 26 of FIG. 1, where the defect detector computes sample powers to detect burst errors as discussed above in conjunction with FIGS. 1-3, and where the data is binary.

Referring to FIGS. 1 and 6, at a block 140, the defect detector 36 receives from the buffer 34 the equalized samples for a data sector of the storage medium 12, and calculates from the samples the window-sample powers for each location 46 of the window 48. The equalized samples represent the data stored in a data sector of the storage medium 12. Because the defect detector 36 need not interact with the channel detector 38 to computer the window sample-power values, the defect detector may compute the window values ahead of time (e.g., before the channel detector begins processing the samples of the data sector) so as not to slow down or otherwise delay the operation of the channel detector and LDPC decoder 26.

At a block 142, the defect detector 36 determines if there are any more window locations 46 for which to calculate sample-power values. If there are more window locations, then the defect detector 36 returns to the block 140. If there are no more window locations, then the defect detector 36 proceeds to a block 144.

At the block 144, the defect detector 36 detects and identifies the locations of burst errors in the samples, and thus detects and identifies defective regions of the storage medium 12, by comparing the window values to the drop-out and drop-in thresholds $TH_L$ and $TH_H$ as discussed above in conjunction with FIG. 3.

At a block 146, the defect detector 36 determines if there are any more window values to compare to $TH_L$ and $TH_H$. If there are more window values, then the defect detector 36 returns to the block 144. If there are no more window values, then the defect detector 36 proceeds to a block 148.

At the block 148, the defect detector 36 flags the burst errors, and thus flags the defective regions of the storage medium 12, by sending to the channel detector 38 the beginning and ending samples for each identified burst error/defective region.

At a block 150, the channel detector 38 begins to process the equalized samples from the buffer 34, the equalized samples representing the data stored in the data sector of the storage medium 12. As discussed above, the channel detector 38 processes the samples by recovering a respective data bit corresponding to each sample, and by generating for each data bit a respective full LLR. Next, for each data bit that is not recovered from a defective region of the storage medium 12, the channel detector 38 generates a respective extrinsic LLR by subtracting from the respective full LLR a respective a-priori LLR previously received from the LDPC decoder 26 (for the first pass through the channel detector 38, the a-priori LLR is zero). But for each data bit that is recovered from a defective region of the storage medium 12, the channel detector 38 generates a respective extrinsic LLR by subtracting from the respective full LLR a respective a-priori LLR scaled by a scale factor $\alpha$.

At a block 152, the LDPC decoder 26 receives the recovered data bits and extrinsic LLRs from the channel detector 38, and uses the extrinsic LLRs to decode the recovered data bits.

At a block 154, if all of the syndromes that the LDPC decoder 26 generates from the decoded data bits equal zero, then the LDPC decoder has found no errors, and provides the decoded data bits to the general decoder 28. But if at least one of the syndromes does not equal zero, then the LDPC decoder 26 proceeds to a block 156.

At the block 156, if not all of the LDPC syndromes equal zero, and the channel detector 38 and the LDPC decoder 26 have repeated the above-described procedure (starting at the block 150) more than a maximum number of outer iterations, then the LDPC decoder 26 may provide the erroneous decoded data to the general decoder 28 for further decoding and error correction, or the channel detector or LDPC decoder may request the read-channel front end 30 to re-read the data sector, and then to re-perform one or more new outer iterations with new samples of the same data sector.

But if at the block 156 the channel detector 38 and LDPC decoder 26 have not repeated the above-described procedure (starting at the block 150) more than the maximum number of outer iterations, then the LDPC decoder 26 generates a respective a-priori LLR value for each decoded data bit, provides the a-priori LLR values to the channel detector, and the channel detector begins a subsequent outer iterations starting at the block 150.

Still referring to FIGS. 1 and 6, alternate embodiments of the above-described procedure are contemplated. For example, the channel detector 38 and LDPC decoder 26 may generate reliability values other than LLR values.

Figure 7:
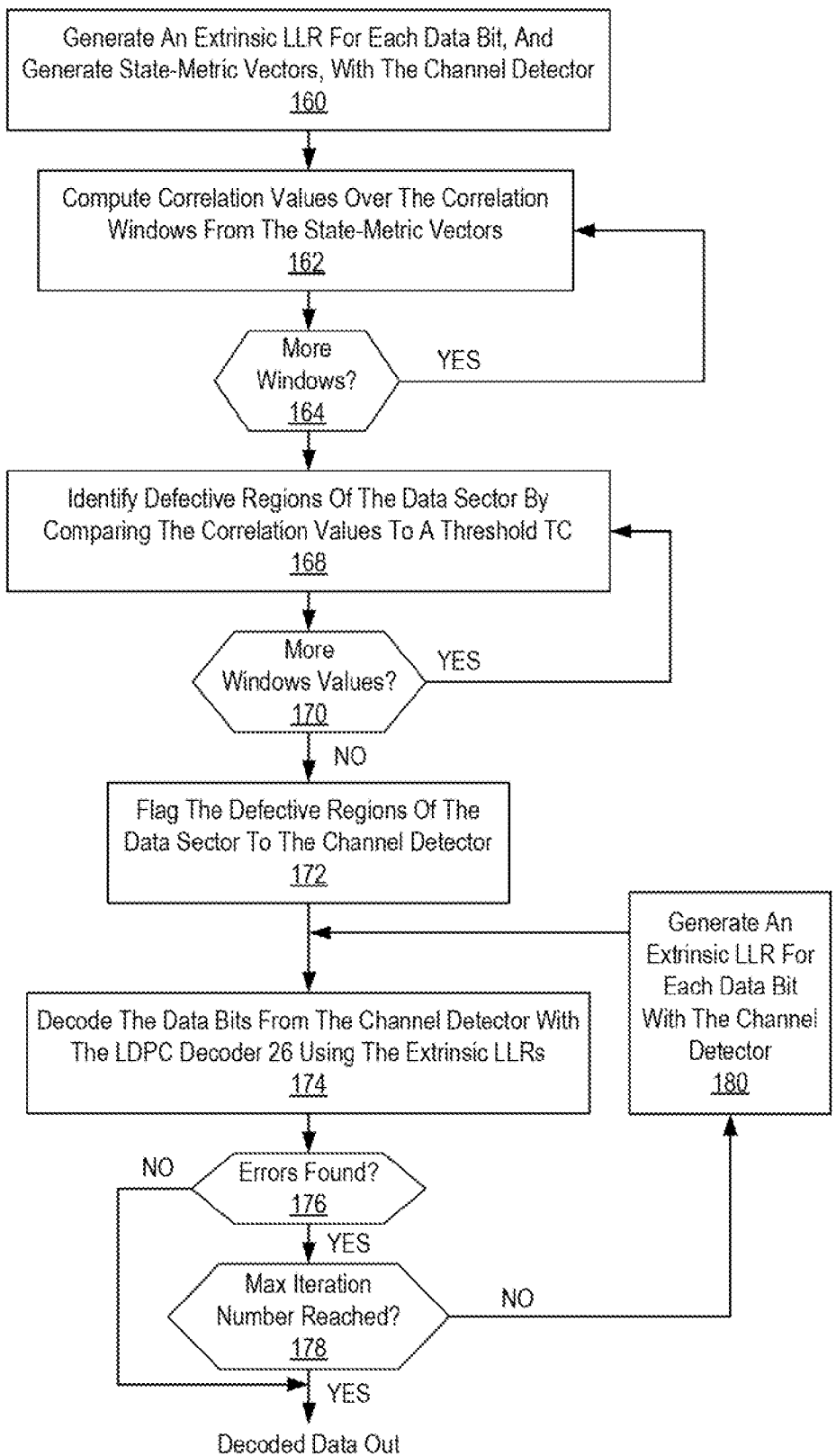
FIG. 7 is a flow diagram of another embodiment of a technique that may be implemented by an embodiment of the read path of FIG. 1 for identifying detective regions of a storage medium and for recovering data written to the identified detective regions.

FIG. 7 is a flow diagram of an example of the operation of an embodiment of the defect detector 36, channel detector 38, and LDPC decoder 26 of FIG. 1, where the defect detector computes state-metric correlation values to detect burst errors as discussed above in conjunction with FIGS. 1, 4, and 5, and where the data is binary.

Referring to FIGS. 1, 2, and 7, at a block 160, in a first outer iteration, the channel detector 38 begins to process the equalized samples from the buffer 34, the equalized samples representing the data stored in a data sector of the storage medium 12. As discussed above, the channel detector 38 processes the samples by recovering a respective data bit corresponding to each sample, and by generating for each data bit a respective full LLR. Next, for each data bit that is not recovered from a defective region of the storage medium 12, the channel detector 38 generates a respective extrinsic LLR by subtracting from the respective full LLR a respective a-priori LLR previously received from the LDPC decoder 26; but for each data bit that is recovered from a defective region of the storage medium 12, the channel detector 38 generates a respective extrinsic LLR by subtracting from the respective full LLR a respective a-priori LLR scaled by a scale factor α, e.g., of less than unity. But because this is the first outer iterations, the a-priori LLRs are zero. Furthermore, while processing the equalized samples, the channel detector 38 also generates state-metric vectors SM as described above in conjunction with FIG. 4.

At a block 162, the defect detector 36 receives the state-metric vectors from the channel detector 38, and, for each location 46 of the window 48 (FIG. 2), correlates the state-metric vectors corresponding to the window location to generate window correlation values. The defect detector 36 may correlate the state-metric vectors using a conventional correlation function.

At a block 164, the defect detector 36 determines if there are any more window locations 46 for which to calculate state-metric correlation values. If there are more window locations, then the defect detector 36 returns to the block 162. If there are no more window locations, then the defect detector 36 proceeds to a block 168.

At the block 168, the defect detector 36 detects and identifies the locations of burst errors, and thus detects and identifies defective regions of the storage medium 12, by comparing the window-correlation values to the threshold TC as discussed above in conjunction with FIG. 4.

At a block 170, the defect detector 36 determines if there are any more window-correlation values to compare to TC. If there are more window-correlation values, then the defect detector 36 returns to the block 168. If there are no more window values, then the defect detector 36 proceeds to a block 172.

At the block 172, the defect detector 36 flags the burst errors, and thus flags the defective regions of the storage medium 12, by sending to the channel detector 38 the beginning and ending sample locations of each identified burst error/defective region.

At a block 174, the LDPC decoder 26 receives the recovered data bits and extrinsic LLRs from the channel detector 38, and uses the extrinsic LLRs to decode the recovered data bits.

At a block 176, if all of the syndromes that the LDPC decoder 26 generates from the decoded data bits equal zero, then the LDPC decoder has found no errors, and provides the decoded data bits to the general decoder 28. But if at least one of the syndromes does not equal zero, then the LDPC decoder 26 proceeds to a block 178.

At the block 178, if not all of the LDPC syndromes equal zero, and the channel detector 38 and the LDPC decoder 26 have repeated the above-described channel-detection and LDPC-decoding procedure more than a maximum number of outer iterations, then the LDPC decoder 26 may provide the erroneous decoded data to the general decoder 28 for further decoding and error correction, or the channel detector or LDPC decoder may request the read-channel front end 30 to re-read the data sector, and then to re-perform one or more new outer iterations with new samples of the same data sector.

But if at the block 178 the channel detector 38 and LDPC decoder 26 have not repeated the above-described channel-detection and LDPC-decoding procedure more than the maximum number of outer iterations, then the LDPC decoder 26 generates a respective a-priori LLR value for each decoded data bit, and provides the a-priori LLR values to the channel detector.

At a block 180, the channel detector 38 conventionally re-processes the equalized samples for the same data sector using the a-priori LLR values from the LDPC decoder 26. For each data bit that is not recovered from a defective region of the storage medium 12, the channel detector 38 generates a respective extrinsic LLR by subtracting from the respective full LLR a respective a-priori LLR received from the LDPC decoder 26, and for each data bit that is recovered from a defective region of the storage medium, the channel detector generates a respective extrinsic LLR by subtracting from the respective full LLR a respective a-priori LLR scaled by a scale factor α.

Then the program control returns to the block 174.

Still referring to FIGS. 1 and 7, alternate embodiments of the above-described procedure are contemplated. For example, the channel detector 38 and LDPC decoder 26 may generate reliability values other than LLR values. Moreover, the defect detector 36 may perform the functions in blocks 162-172 while the LDPC decoder 26 is performing the functions in blocks 174-178 during a first outer-iteration of the data recover-decode proceeding. Furthermore, the defect detector 38 may implement both the sample-power detection procedure (FIG. 6) and the correlation procedure (FIG. 7) together for higher reliability in detecting burst errors, and, thus, in detection defective medium regions. For example, the defective region may be identified as the overlapping portion of the defective regions identified independently by the two procedures.

Moreover, referring to FIGS. 1-7, the defect detector 36, and any other component of the data path 10, may be implemented in hardware, software, or a combination of hardware and software.

Figure 8:
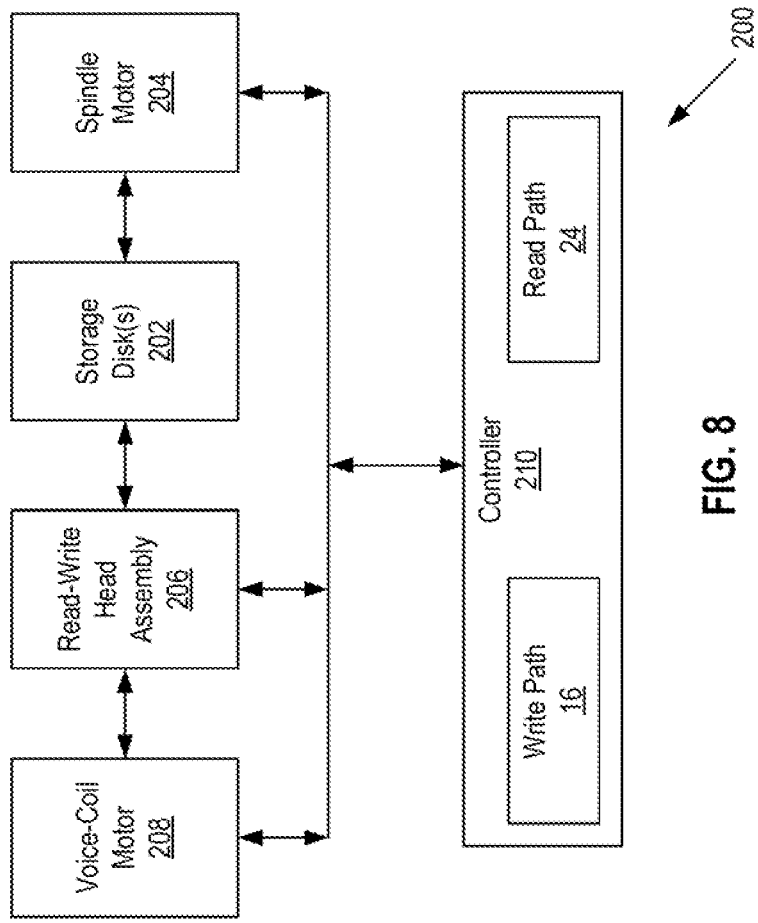
FIG. 8 is a block diagram of an embodiment of a storage-media drive that incorporates an embodiment of the read path of FIG. 1.

FIG. 8 is a block diagram of an embodiment of a media drive 200, which may incorporate an embodiment of the data path 10 of FIG. 1.

The media drive 200 includes at least one data-storage disk 202, which may include the storage medium 12 of FIG. 1, a spindle motor 204 for rotating the disk, a read-write head assembly 206 for holding the head over the disk surface, a voice coil motor 208 for moving the head assembly, and a controller 210 for controlling the spindle and voice-coil motors. At least one component of the write path 16 and read path 24 may be disposed on the controller 210, although at least the read-write head may be attached to the assembly 206 and be remote from the controller. Alternatively, the controller 210 may be mounted on the assembly 206, and may even include the read-write head.

Figure 9:
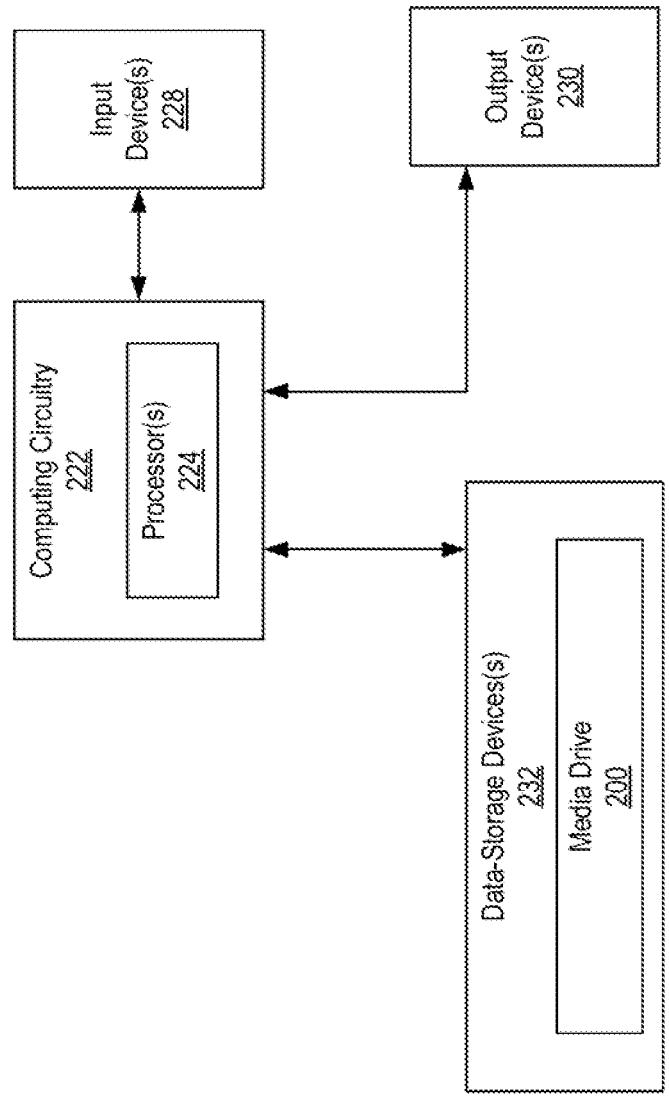
FIG. 9 is a block diagram of an embodiment of a system that incorporates an embodiment of the storage-media drive of FIG. 8.

FIG. 9 is a block diagram of a system 220 (here a computer system), which may incorporate an embodiment of the media drive 200 of FIG. 8.

The system 220 includes computer circuitry 222 for performing computer functions, such as executing software to perform desired calculations and tasks. The circuitry 222 typically includes a controller, processor, or one or more other integrated circuits (ICs) 224, and includes a power supply (not shown in FIG. 9), which provides power at least to the IC(s) 224. One or more input devices 228, such as a keyboard or a mouse, are coupled to the computer circuitry 222 and allow an operator (not shown in FIG. 9) to manually input data thereto. One or more output devices 230 are coupled to the computer circuitry 222 to provide to the operator data generated by the computer circuitry. Examples of such output devices 230 include a printer and a video display unit. One or more data-storage devices 232, including the media drive 200, are coupled to the computer circuitry 222 to store data on or retrieve data from storage media. Examples of the storage devices 232 and the corresponding storage media include drives that accept hard and floppy disks, tape cassettes, compact disk read-only memories (CD-ROMs), and digital-versatile disks (DVDs).

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. A data read path, comprising:
a defect detector configured to identify a defective region of a data-storage medium by at least
determining a level of channel-detector values generated in response to the defective region, and
identifying the defective region in response to the level, the identifying comprising:
determining a respective correlation level for each of multiple overlapping windows of state-metric values, each window having a same size and corresponding to a respective data-storage location of the data-storage medium; and
identifying the defective region as including a first region of the data-storage medium where the correlation levels of the windows corresponding to the data-storage locations within the first region have a relationship to a first threshold; and
a data recovery circuit configured to recover data from the data-storage medium in response to the defect detector.

2. The data read path of claim 1 wherein the defect detector is further configured to identify the defective region by at least:
determining respective correlation levels of the channel-detector values respectively generated in response to multiple regions of the data-storage medium, the multiple regions including the defective region; and
identifying the defective region as including a first region where a correlation level corresponding to the first region has a relationship to a second threshold.

3. The data read path of claim 1 wherein
identifying the defective region further comprises identifying the defective region as including at least one second region adjacent to the first region.

4. The data read path of claim 1 wherein the data-storage medium comprises a disk drive.

5. A media drive comprising:
a data-storage medium configured to store data;
a media-drive controller comprising a data-write path configured to write data to the data-storage medium; and
a data read path comprising
a defect detector configured to identify a defective region of a data-storage medium by at least determining a level of channel-detector values generated in response to the defective region and identifying the defective region in response to the level, the identifying comprising:
determining a respective correlation level for each of multiple overlapping windows of state-metric values, the state-metric values being different from the channel-detector values, each window having an identical length and corresponding to a respective data-storage location of the data-storage medium; and
identifying the defective region as including a first region of the data-storage medium where the correlation levels of the windows corresponding to the data-storage locations within the first region have a relationship to a first threshold, and
a data recovery circuit configure to recover data from the data-storage medium in response to the defect detector.

6. The media drive of claim 5 wherein the defect detector is further configured to identify the defective region by at least:
determining respective correlation levels of the channel-detector values respectively generated in response to multiple regions of the data-storage medium, the multiple regions including the defective region; and
identifying the defective region as including a first region where a correlation level corresponding to the first region has a relationship to a second threshold.

7. The media drive of claim 5 wherein
identifying the defective region further comprises identifying the defective region as including at least one second region adjacent to the first region.

8. The media drive of claim 5 wherein the data-storage medium comprises a disk drive.

9. A method comprising:
identifying a defective region of a data-storage medium by at least determining a level of channel-detector values generated in response to the defective region, and identifying the defective region in response to the level, the identifying further comprising:
determining a respective correlation level for each of multiple overlapping windows of state-metric values, each window including an identical number of samples and corresponding to a respective data-storage location of the data-storage medium; and
identifying the defective region as including a first region of the data-storage medium where the correlation levels of the windows corresponding to the data-storage locations within the first region have a relationship to a first threshold; and
recovering data from the data-storage medium in response to the defect detector.

10. The method of claim 9 wherein identifying the defective region further comprises:
determining respective correlation levels of the channel-detector values respectively generated in response to multiple regions of the data-storage medium, the multiple regions including the defective region; and
identifying the defective region as including a first region where a correlation level corresponding to the first region has a relationship to a second threshold.

11. The method of claim 9 wherein identifying the defective region further comprises:
identifying the defective region as including at least one second region adjacent to the first region.

12. The method of claim 9 wherein the data-storage medium comprises a disk drive.

13. A method comprising:
identifying a defective region of a data-storage medium, the identifying comprising:
determining a respective correlation level for each of multiple overlapping windows of state-metric values, each window having a same length and corresponding to a respective data-storage location of the data-storage medium; and
identifying the defective region as including a first region of the data-storage medium where the correlation levels of the windows corresponding to the data-storage locations within the first region have a relationship to a first threshold;
recovering a first data element from the identified defective region;
recovering a second data element from another region of the data-storage medium that is not identified as being defective;
generating a first reliability value corresponding to the first data element in a first manner; and
generating second reliability value corresponding to the second data element in a second manner that is different from the first manner.

14. The method of claim 13 wherein identifying the defective region comprises:
determining a level of channel-detector values generated in response to the defective region; and
identifying the defective region in response to the level.

15. The method of claim 14 wherein identifying the defective region further comprises:
determining respective correlation levels of the channel-detector values respectively generated in response to multiple regions of the data-storage medium, the multiple regions including the defective region; and
identifying the defective region as including a first region where a correlation level corresponding to the first region has a relationship to a second threshold.

16. The method of claim 14 wherein identifying the defective region further comprises:
identifying the defective region as including at least one second region adjacent to the first region.

17. The method of claim 13 wherein the data-storage medium comprises a disk drive.

* * * * *